United States Patent
Hamo et al.

(10) Patent No.: US 12,242,754 B2
(45) Date of Patent: Mar. 4, 2025

(54) AUTOMATIC DATA ERASE FROM DATA STORAGE DEVICE

(71) Applicant: Western Digital Technologies, Inc., San Jose, CA (US)

(72) Inventors: Eyal Hamo, Naharia (IL); Sagi Taragan, Ramat Ishay (IL); Alexander Lemberg, Netanya (IL)

(73) Assignee: Sandisk Technologies, Inc., Milpitas, CA (US)

( * ) Notice: Subject to any disclaimer, the term of this patent is extended or adjusted under 35 U.S.C. 154(b) by 79 days.

(21) Appl. No.: 17/852,363

(22) Filed: Jun. 29, 2022

(65) Prior Publication Data

US 2024/0004574 A1    Jan. 4, 2024

(51) Int. Cl.
*G06F 3/06*    (2006.01)

(52) U.S. Cl.
CPC .......... *G06F 3/0655* (2013.01); *G06F 3/0604* (2013.01); *G06F 3/0652* (2013.01); *G06F 3/0679* (2013.01)

(58) Field of Classification Search
CPC .... G06F 3/0655; G06F 3/0604; G06F 3/0652; G06F 3/0679; G06F 12/0246
See application file for complete search history.

(56) References Cited

U.S. PATENT DOCUMENTS

| | | | |
|---|---|---|---|
| 2008/0046998 A1* | 2/2008 | Cromer | G06F 21/805 726/17 |
| 2014/0281134 A1* | 9/2014 | Eitan | G06F 12/0246 711/103 |
| 2015/0106550 A1* | 4/2015 | Hamaguchi | G06F 3/0652 711/103 |
| 2015/0169462 A1* | 6/2015 | Vaisanen | H04L 9/0662 711/166 |
| 2017/0111286 A1* | 4/2017 | Kawamura | G06F 3/0635 |
| 2021/0303173 A1* | 9/2021 | Wu | G06F 3/0611 |
| 2021/0374079 A1* | 12/2021 | Shin | G06F 13/1668 |
| 2022/0138059 A1* | 5/2022 | Lee | G06F 11/0772 714/4.5 |
| 2023/0096111 A1* | 3/2023 | Kim | G06F 3/061 711/154 |
| 2023/0195351 A1* | 6/2023 | Kachare | G06F 12/0246 711/103 |

* cited by examiner

*Primary Examiner* — Nanci N Wong
(74) *Attorney, Agent, or Firm* — Patent Law Works LLP

(57) ABSTRACT

A data storage device comprising a non-volatile storage medium configured to store user data, a data port configured to receive and transmit data between a host computer system and the data storage device, and a controller. The controller is configured to receive, via the data port, a write command comprising a read restriction indication, receive, via the data port, data and write the data to an address of the non-volatile storage medium. The controller is further configured to determine an occurrence of a read restriction event, and in response to the occurrence of the read restriction event and in response to the read restriction indication, erase the data from the address of the non-volatile storage medium.

20 Claims, 12 Drawing Sheets

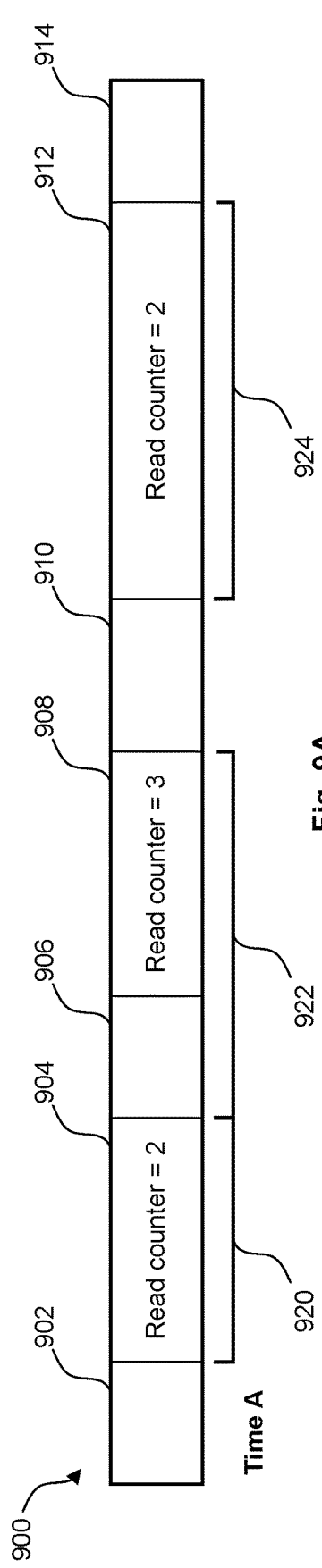
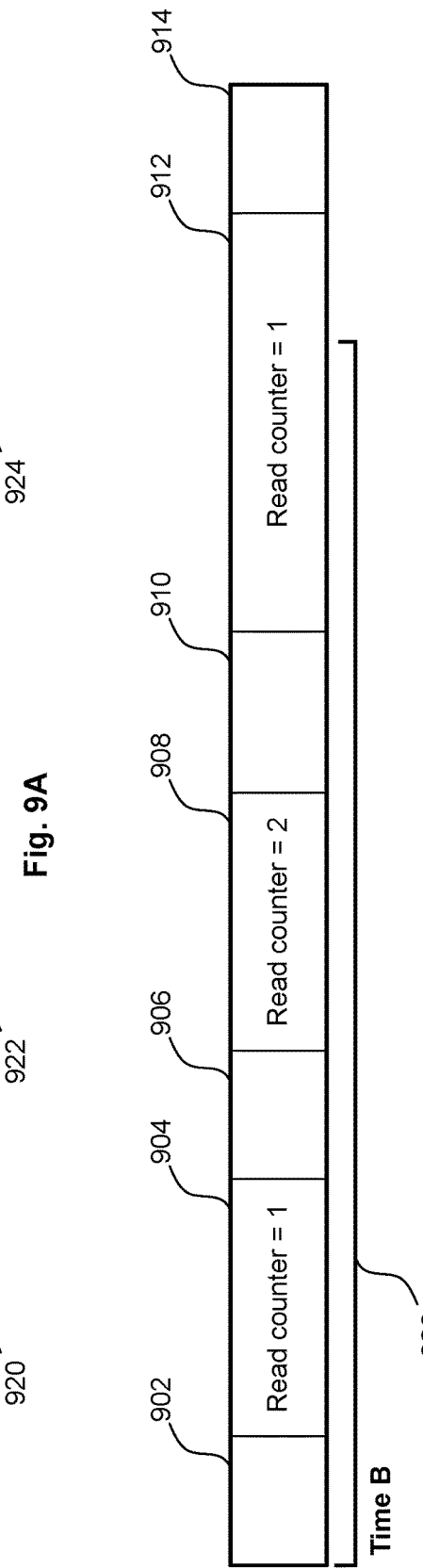
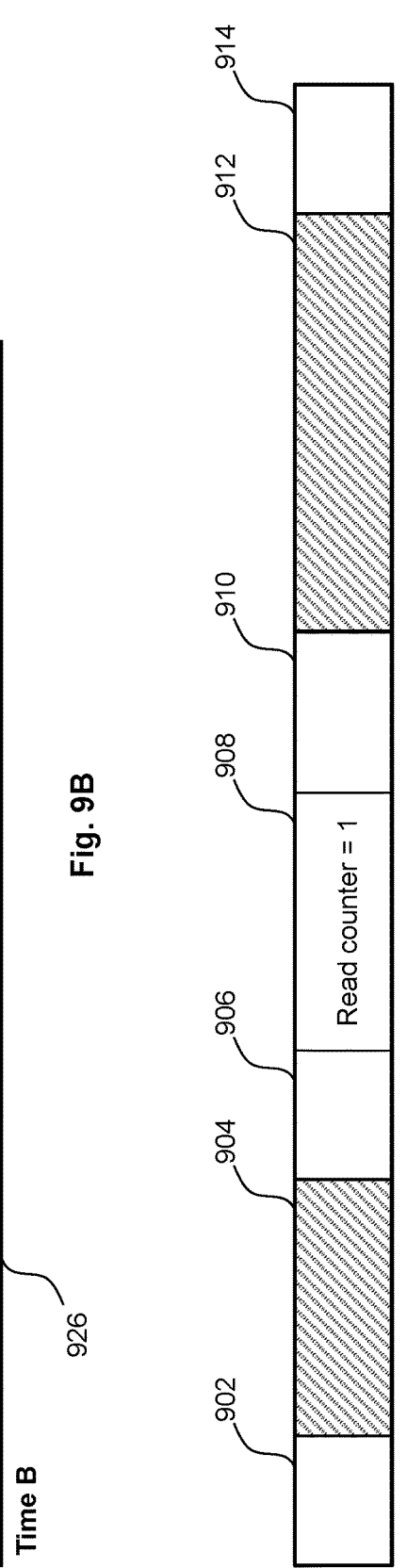
Fig. 9A
Fig. 9B
Fig. 9C

AUTOMATIC DATA ERASE FROM DATA STORAGE DEVICE

TECHNICAL FIELD

This disclosure relates to read restriction techniques for a data storage device. In particular, this disclosure relates to a data storage device configured to erase a portion of data in response to the occurrence of a read restriction event.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the computing system. From the perspective of the computing system, a DSD may be implemented as a block storage device where the data stored is in the form of one or more blocks, being sequences of bytes or bits having a maximum length, referred to as block size.

DSDs may be used to supplement the data storage capabilities of a host computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). Integrated DSDs may form a component of a larger system in which a host component utilises the integrated DSD to store data.

In some situations, it is desirable for the host computer system to cause the erasure of data stored in a data storage device. A host computer system may cause the erasure of data for data-security purposes, or to effectively manage finite data-storage resources.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

SUMMARY

Disclosed herein is a data storage device comprising a non-volatile storage medium configured to store user data, a data port configured to receive and transmit data between a host computer system and the data storage device, and a controller, The controller is configured to receive, via the data port, a write command comprising a read restriction indication, receive, via the data port, a portion of data, and write the portion of data to an address of the non-volatile storage medium. The controller is further configured to determine an occurrence of a read restriction event, and in response to the occurrence of the read restriction event and in response to the read restriction indication, erase the portion of data from the address of the non-volatile storage medium.

In some embodiments, determining the occurrence of the read restriction event comprises receiving, via the data port, a read command to read the portion of data from the address of the non-volatile storage medium.

In some embodiments, the controller is further configured to receive, via the data port, a read command to read the portion of data from the address of the non-volatile storage medium, and in response to receiving the read command, transmit, via the data port, the portion of data from the address of the non-volatile storage medium.

In some embodiments, determining the occurrence of the read restriction event comprises receiving, via the data port, a read number of read commands to read the portion of data from the address of the non-volatile storage medium. In some embodiments, the read restriction indication comprises an indication of the read number.

In some embodiments, the read restriction event comprises a time event, and determining an occurrence of the read restriction event comprises determining an occurrence of a time event.

In some embodiments, the read restriction event comprises a trigger event, and determining the occurrence of the read restriction event comprises determining an occurrence of the trigger event. In some embodiments, determining the occurrence of the trigger event comprises receiving, via the data port, a command.

In some embodiments, the read restriction indication comprises an indication of the read restriction event. In some embodiments, the controller is further configured to receive, via the data port, a configuration command, wherein the configuration command comprises the an indication of the read restriction event.

In some embodiments, the write command further comprises an indication of the address of the non-volatile storage medium.

In some embodiments, the read restriction indication comprises an indication of erase priority, and wherein the controller is configured to erase the data from the address of the non-volatile storage medium in accordance with the erase priority.

In some embodiments, erasing the portion of data from the address comprises unmapping a logical block address associated with the portion of data. In some embodiments, erasing the portion of data from the address comprises writing overwrite data to the address.

In some embodiments, the write command is compatible with a version of the JEDEC Integrated UFS Specification.

In some embodiments, the write command comprises a UFS Protocol Information Unit data structure.

Disclosed herein is a method for erasing a portion of data from a data storage device. The data storage device comprises a non-volatile storage medium configured to store data, and a data port configured to receive and transmit data between a host computer system and the data storage device. The method comprises receiving, via the data port, a write command comprising a read restriction indication, receiving, via the data port, a portion of data, and writing the portion of data to an address of the non-volatile storage medium. The method further comprises determining a read restriction event, and in response to the read restriction event and in response to the read restriction indication, erasing the portion of data from the address of the non-volatile storage medium.

In some embodiments, the read restriction event comprises receiving, via the data port, a read command to read the portion of data from the address of the non-volatile storage medium. In some embodiments, the method further comprises receiving, via the data port, a read command to read the portion of data from the address of the non-volatile storage medium, and in response to receiving the read command, transmitting, via the data port, the portion of data from the address of the non-volatile storage medium.

Disclosed herein is a data storage device comprising means to store data, and means to receive and transmit data between a host computer system and the data storage device. The data storage device further comprises means to receive a write command comprising a read restriction indication, receive a portion of data, write the portion of data to the means to store data, determine a read restriction event, and in response to the read restriction event and in response to the read restriction indication, erase the portion of data from the means to store data.

BRIEF DESCRIPTION OF DRAWINGS

One or more implementations of the invention will now be described with reference to the accompanying drawings, in which:

FIG. 9A illustrates a section of the storage medium at Time A, according to an embodiment;

FIG. 9B illustrates section of the storage medium at Time B, according to an embodiment;

FIG. 9C illustrates section of the storage medium at Time C, according to an embodiment;

DESCRIPTION OF EMBODIMENTS

Data storage devices described herein provide an improved solution for providing a host computer system status information determined by the data storage device, or a component or sensor associated with the data storage device.

It is an advantage of the described embodiments that communication overhead, over the communication interface between the host computer system and the DSD, may be reduced in the provision of the status information to the host computer system.

Figure 1:
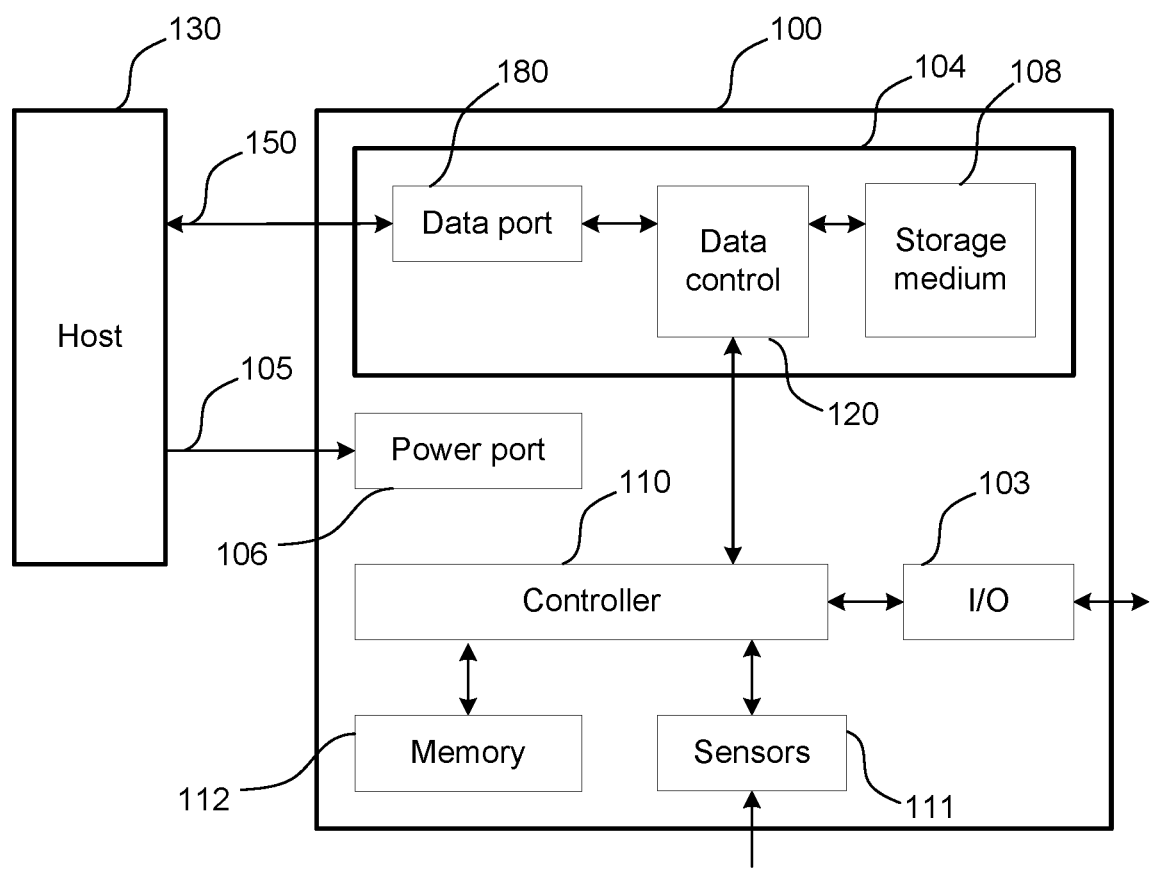
FIG. 1 illustrates a data storage device in communication with a host computer system, according to an embodiment.

FIG. 1—Data Storage Device

FIG. 1 illustrates a data storage device (DSD) 100 (hereinafter 'device 100') and a host computer system 130, according to an embodiment. The device 100 is configured to provide data storage functionality to the host computer system 130 (hereinafter 'the host 130'). The device 100 comprises a data path 104 and a controller 110. The data path 104 comprises a data port 180 configured to receive data from the host computer system 130 and configured to transmit data from the device 100 to the host 130.

Storage Medium

The device 100 further comprises a storage medium 108 to provide data storage functionality to the host 130. The storage medium 108 may also store data to be utilised by the device 100. The data stored in data store 108 may include one or more blocks of data organized into files, for example including images, documents, videos, etc., according to a particular file system operable by the host 130. The storage medium 108 is non-transitory so as to retain the stored data irrespective of whether the medium 108 is powered. The medium 108 may comprise flash memory, which may be in the form of secure digital (SD) memory or iNAND® embedded flash memory. The medium 108 may comprise a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the data is written in blocks to the storage medium 108 and read in blocks from the storage medium 108.

Interfaces

Data interface 150 is configured to transmit data to and from the data port 180 and the host 130. The data interface 150 may comprise a wired interface, a wireless interface, a packet switched network, a memory buffer, a memory space that is accessible by the host and the device, any combination of these means, or another means of conveying data between the host and the device. Data transmitted over the data interface 150 may comprise commands, command responses, status information, data, user data or other digital information. The host 130 may comprises a device driver which is configured to communicate with the device 100 over data interface 150.

The host 130 may further be configured to provide power to the device 100 over power interface 105 to power port 180. The power port 106 and the data port 180 may be implemented collectively as, for example, some form of USB port (e.g., USB-A, USB-8, USB-C, mini-USB, micro-USB, etc.), a Thunderbolt port, a Power over Ethernet (PoE) port, or a similar port. The device 100 may receive power from a source other than the host 130.

Data Control

The device 100 further comprises a data control unit 120. The data control unit 120 is configured to perform read operations to read data from the storage medium 108 and provide data to the host 130 via the data port 180, or to the controller 110 for use by the controller 110. The data control unit 120 is further configured to perform write operations to write data, received from the host 130 via the data port 180, to the storage medium 108. The data control unit 120 may further write data, received from the controller 110, to the storage medium 108. In some embodiments, the data control unit 120 may process the data before writing data to the storage medium.

In some embodiments, the data control unit 120 includes a cryptography engine configured to receive, interpret and execute commands received from host 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine may be connected between the data port 180 and the storage medium 108 and be configured to use a cryptographic key to encrypt data to be stored on the storage medium 108, and to decrypt the encrypted data stored on the storage medium 108 in response to a request from the host 130. The controller 110 causes the cryptography engine 107 to control a cryptographic state of the data stored in the storage medium 108 (i.e., encrypted or plain). In one mode of operation, the unencrypted data may pass through the data path 104 to the host 130 via the data port 180.

Controller

The device 100 further comprises a controller 110. The controller 110 may be comprised of one or more processors, microprocessors, microcontrollers or controlling circuitry. The controller 110 is configured to execute program code stored within the system memory 112 to issue commands for controlling the operation of the device 100. Accordingly, actions performed by the device 100 may be considered to be actions performed by the controller 110. Similarly, decisions and determinations made by the device 100 may be considered to be decisions and determinations made by the controller 110.

The system memory 112 may store device specific data, such as a unique identifier of the device 100. The system memory 112 may further store configuration information which defines the function of the device 100. The device 100 may receive configuration information from the host 130, and store the configuration information in the system memory 112.

The function of the controller 110 includes, but is not limited to, controlling data transmission through data path 104, and responding to commands receive from the host 130, as described herein below.

IO Interface

The device 100 may include an input/output (TO) interface 103. The IO interface 103 may include one or more input components configured to accept an input from a user. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to a user. For example, the output components may include a speaker, configured to emit audible signals, one or more visual indicators, such as a light or a display, configured to emit visual signals.

In one embodiment, the visual indicators include at least one data access state indicator configured provide a user with an indication of the data access state of the device 100. The DA state indicator visually displays the data access state to a user.

Sensors

The device 100 may include a sensor component 111 configured to receive sensor information from one or more sensors within the device 100 or in communication with the device 100. The sensor component 111 may be configured to receive sensor information from an ambient temperature sensor, a surface temperature sensor configured to determine a surface temperature associated with the enclosure of the device 100, a thermal junction sensor, a power rate consumption sensor, an accelerometer, or another sensor.

DSD Enclosure

The device 100 may include an enclosure configured to physically house the components of the device 100. The enclosure may formed from a rigid, or semi-rigid, material with particular properties (e.g., electrical resistance and impact strength) suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Power

The power interface 105 between the host 130 and the device 100 supplies power from the host 130 to the power port 106 of the device 100. In one embodiment, the power interface 105 comprises a USB interface which is configured to supply typically 5 V at 500 mA or higher currents. In one embodiment, the power interface 105 comprises a wireless charging interface. In one embodiment, in response to the device 100 being operably coupled to host 130 via interface 105, the device 100 consumes power from the host 130 to operate the electronic circuitry of the device 100.

Figure 2:
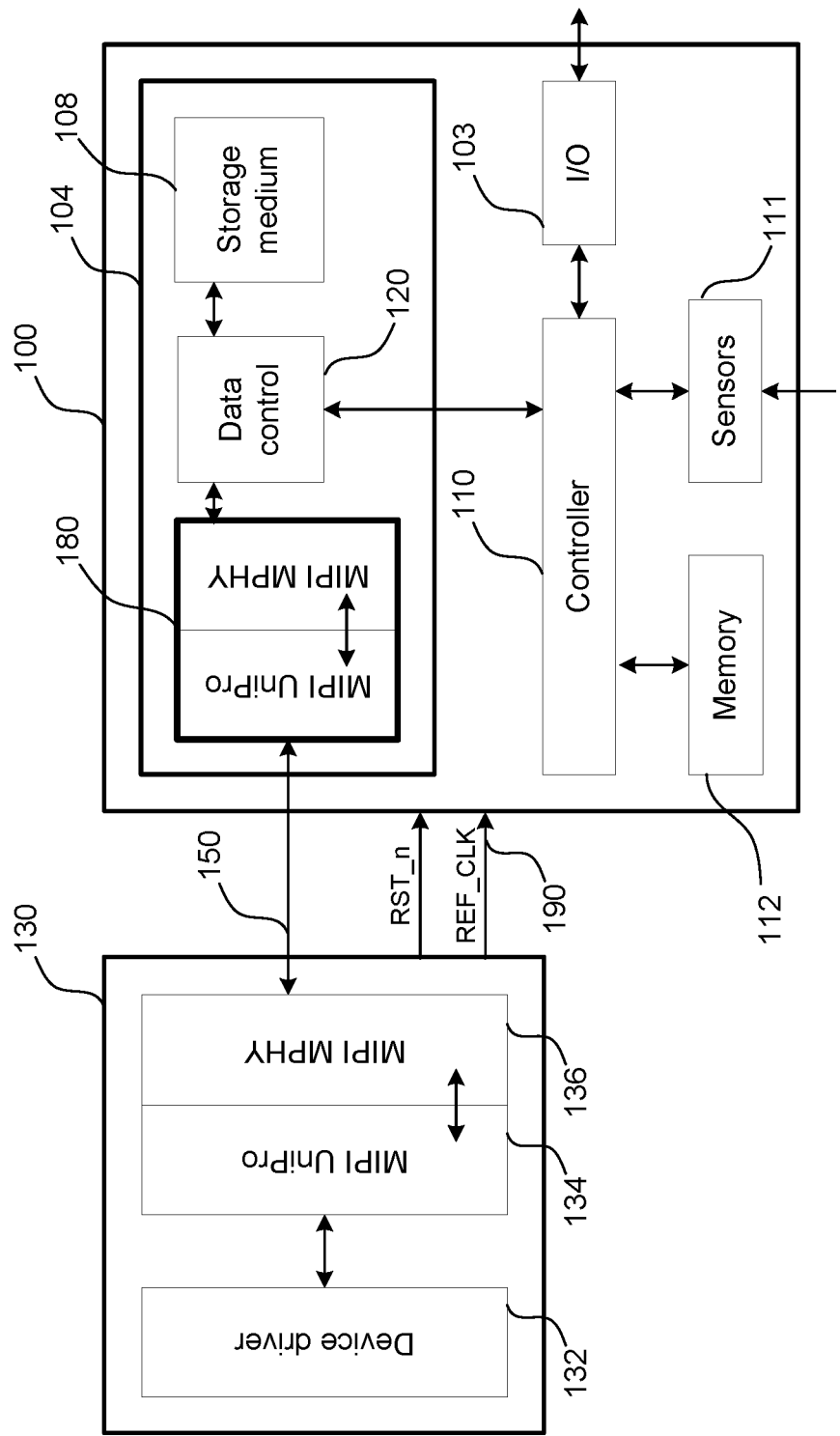
FIG. 2 illustrates additional internal components of the data storage device and the host computer system of FIG. 1, according to an embodiment.

FIG. 2—Unified Flash Storage

FIG. 2 illustrates a data storage device (DSD) 100 and a host computer system 130, according to another embodiment. In the embodiment illustrated in FIG. 2, the device 100 is configured to communicate with the host 130 according to the Universal Flash Storage (UFS) communication protocol, as defined by the Joint Electron Device Engineering Council (JEDEC) Solid State Technology Association. In particular the device 100 and the host communication according to the JEDEC UFS protocol, version 4.0.

In the embodiment illustrated in FIG. 2, the data interface 150 comprises a Unified Protocol (UniPro) interface. UniPro is a high-speed interface technology which may be used to interconnect integrated circuits. The data interface 150 may comprise a plurality of wires or connections. The data interface 150 may form a Mobile Industry Processor Interface physical layer (MIPI M-PHY®) over which the host 130 may communicate with the device 100 via a Mobile Industry Processor Interface Unified Protocol (MIPI UniPro®) protocol stack, which includes the UFS Transport Protocol (UTP) layer.

The host 130 comprises a device driver 134 which the host uses to control the functionality of the device 100. The device driver 134 interfaces to the device 100 via the host side MIPI UniPro® protocol stack 134 and the MIPI M-PHY® layer 136. On the device 100 side, the data port 180 comprises a corresponding MIPI UniPro® protocol stack and a MIPI M-PHY® layer, via which the data control unit 120 may interface with the host 130.

Data Structures

The host 130 and the device 100 communicate via the transmission of data structures over the data interface 150. In one embodiment, a data structure comprises a sequence of digital UFS UPIU Data Structures In one embodiment, the command data structures transmitted by the host computer system 130, and the response data structures transmitted by the device 100 are compatible with one or more JEDEC UFS communication standards. In one embodiment, the command data structures transmitted by the host computer system 130, and the response data structures transmitted by the device 100 are compatible with the JEDEC Integrated UFS 4.0 communication standard.

In accordance with the JEDEC Integrated UFS 4.0 communication standard, UFS Transport Protocol Transactions consist of data structures called UFS Protocol Information Units (UPIUs) that travel between a host and a device on the UniPro bus.

A UPIU transaction is initiated by an Initiator device and is responded to by a Target device, in the form of a Request-Response operation. The Initiator device starts the sequence of transactions by sending a request to a Target device. The Target device will then response with a series of transactions that eventually end in a response transaction. With reference to the terminology used within the JEDEC UFS protocol specification, the host 130 may be referred to as the Initiator, and the device 100 may be referred to as the Target.

In one embodiment, the host 130 may transmit a plurality of UPIUs to the device 100, and the device may maintain one or more queues of UPIUs received, via the data port, from the host. The host, or the device, may determine a priority associated with the UPIUs in the one or more queues. The device may process the UPIUs in the one or more queues based on the priority associated with each of the UPIUs.

In accordance with the JEDEC Integrated UFS 4.0 communication standard, UFS UPIUs comprise a single basic header segment, transaction specific fields, possible one or more extended header segments and zero or more data segments. The format of UPIU headers are described in further depth with regard to FIGS. 12 and 13, according to an embodiment.

Data Erasure

A host 130 may utilise the storage medium 108 of the device 100 to store one or more portions of data. A portion of data may comprise one or more discrete units of data. The data within a portion of data may be contiguously stored or transmitted, or may be stored or transmitted in a plurality of discrete portions. A portion of data may comprise one or more files, one or more logical blocks, one or more bytes of data, the data in one or more addressable regions, the data within the entire storage medium or any other grouping of bits.

In some situations, it is desirable for the host to cause the erasure of a portion of data that is stored in a data storage device. In one embodiment, the host may cause the erasure of a portion of data for data-security purposes, so that the portion of data cannot be read from the storage medium. In another embodiment, the host may cause the erasure of a portion of data in order to effectively manage the finite data-storage resources of the storage medium. As such, the host may cause the erasure of portions of data that are no longer required by the host.

Figure 3:
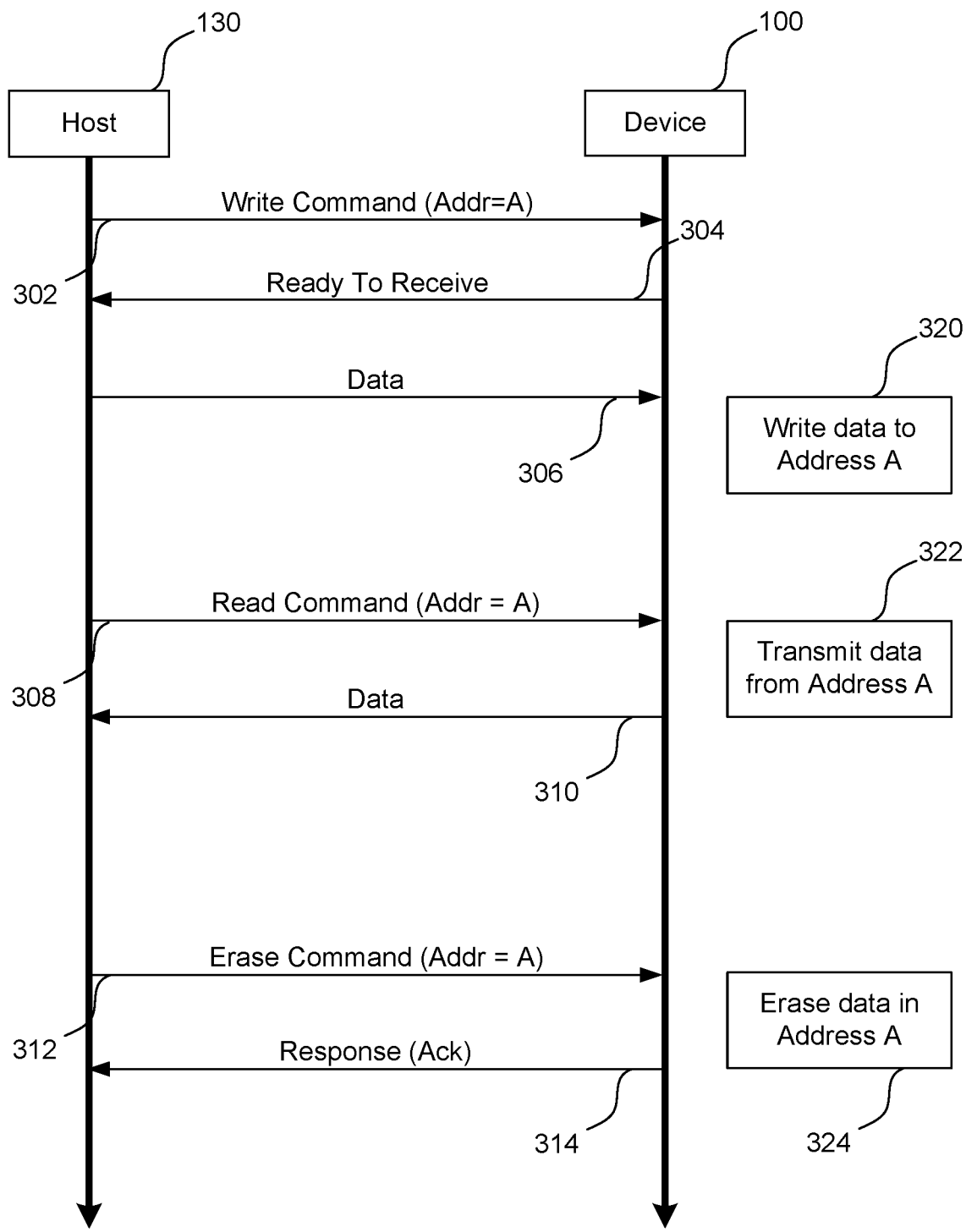
FIG. 3 is a message flow diagram illustrating a transmission of messages to and from the host and the device, according to an example.

FIG. 3—A Method of Erasing a Portion of Data

FIG. 3 is a message flow diagram illustrating a transmission of messages to and from the host 130 and the device 100, according to an example. FIG. 3, and other message flow diagrams incorporated herein, provide an indicative representation of the ordered transmission of communications between the host and the device over data interface 150. Communications may be in the form of data structures, and any data structures may be transmitted across data interface 150 as a contiguous transmission, or as a set of discrete transmissions which may be collated by the receiver. Communications transmitted earlier in time are represented at the top of the message flow diagram, with the transmission of subsequent data structures depicted under earlier transmissions. It is not intended that FIG. 3, and other message flow diagrams incorporated herein, be drawn to scale. Furthermore, it is understood that FIG. 3, and other message flow diagrams incorporated herein, may not represent the entirety of communications occurring between the host and the device, and that additional communications may be transmitted between the communications represented in the incorporated message flow diagrams.

FIG. 3 is a message flow diagram illustrating communications associated with the host erasing a portion of data from the data storage device after reading the portion of data from the data storage device, according to an embodiment.

With reference to the message flow diagram in FIG. 3, the host 130 transmits a command data structure 302 to the device 100. The command data structure 302 comprises a command for the device to write a portion of data to an address of the storage medium 108, indicated as Address A. In some embodiments, in response to receiving command data structure 302, the device transmits an acknowledgement data structure (not shown) which acknowledges receipt of command data structure 302 by the device. The acknowledgement data structure may comprise a JEDEC RESPONSE UIPU.

In response to receiving command data structure 302, the device determines that it is ready to receive the portion of data from the host, and the device transmits a ready-to-transfer data structure 304 to the host. Data structure 304 may comprise a JEDEC READY TO TRANSFER UPIU.

The host 130 transmits, in data structure 306, the portion of data to be written to the storage medium 108. In one embodiment, the portion of data is received by the device as a single data structure transmitted over data interface 150. In one embodiment, the portion of data is received by the device as a plurality of data structures, or packets, transmitted over data interface 150. In response to receiving the portion of data in data structure 306, the device writes 320 the portion of data to Address A of the storage medium 108.

At a subsequent time, the host 130 transmits a read command data structure (abbreviation 'read command') 308, requesting that the device 100 read portion of data from Address A of the storage medium 108 and transmit the portion of data to the host. In some embodiments, in response to receiving read command 308, the device transmits an acknowledgement data structure (not shown) which acknowledges receipt of read command 308 by the device. The acknowledge data structure may comprise a JEDEC RESPONSE UIPU.

In response to receiving the read command data structure 308, the device reads the portion of data from the storage medium and transmits 322 the portion of data to the host in data structure 310.

At a subsequent time, the host 130 determines that the portion of data stored at Address A of the storage medium 108 should be erased. In one example, the host makes this determination to manage the availability of storage space in the storage medium. In another example, the host makes this determination for data-security reasons.

The host 130 transmits an erase command data structure 312 to the device 100. In one embodiment, the erase command data structure 312 comprises a JEDEC Integrated UFS 4.0 UFS UNMAP UPIU command. In one embodiment, the host may configure the device to perform an erase operation in response to receiving a UNMAP UPIU command. In one embodiment, the host may configure the device to perform a discard operation in response to receiving a UNMAP UPIU command. In one embodiment, the erase command data structure 312 comprises a JEDEC Integrated UFS 4.0 UFS ERASE command.

The erase command data structure 312 comprises an indication of Address A of the storage medium. In response to receiving the erase command data structure 312, the device erases 324 the portion of data at Address A of the storage medium.

In response to erase command data structure 312, the device 100 acknowledges receipt of erase command data structure 312 by transmitting acknowledgement data structure 314. In some embodiments, the device is not configured to transmit an acknowledgement response data structure to acknowledge receipt of an erase command data structure. In such embodiments, the host may assume that the device has fully received, and will action, the erase command data structure.

Notably, in order to effect the erasure of the portion of data at Address A of the storage medium, the host transmits an erase command data structure 312 to the device. Additionally, the device performs the erasure of the data in Address A only in response to the receipt of the erase command data structure 312 from the host.

Host-Activated Read Restriction

It may be advantageous for the host 130 to be able to indicate to the device 100, when writing data to the storage medium 108 of the device, that the host intends for the portion of data to be erased by the device.

For example, a host may intend to write data to the storage medium, wherein the host intends for the portion of data to be impermanent, e.g. only read by the host for a limited number of times, or for a limited time period, or until a specified event occurs before the portion of data is of no further use to the host. Accordingly, it may be advantageous for the host to indicate to the device the impermanent nature of the portion of data when the host commands the device to write the portion of data to the storage medium.

By indicating to the device the impermanent nature of the portion of data, the host can instruct the device to take action to automatically erase the portion of data when a specified condition has been met. This specified condition may be indicated by the host. Furthermore, this specified condition may be indicated by the host along with the write command data structure (abbreviation 'write command') which instructs the device to write the portion of data to the storage medium.

Accordingly, embodiments described herein, provide for the receipt, by the device of a write command data structure, via the data port, wherein the write command data structure comprises a read restriction indication. The read restriction indication indicates that the portion of data to be written to the storage medium is impermanent. The read restriction indication may further comprise an indication of a read restriction event. The read restriction event defines the one or more specified conditions which cause the device to erase the portion of data from the storage medium.

Figure 4:
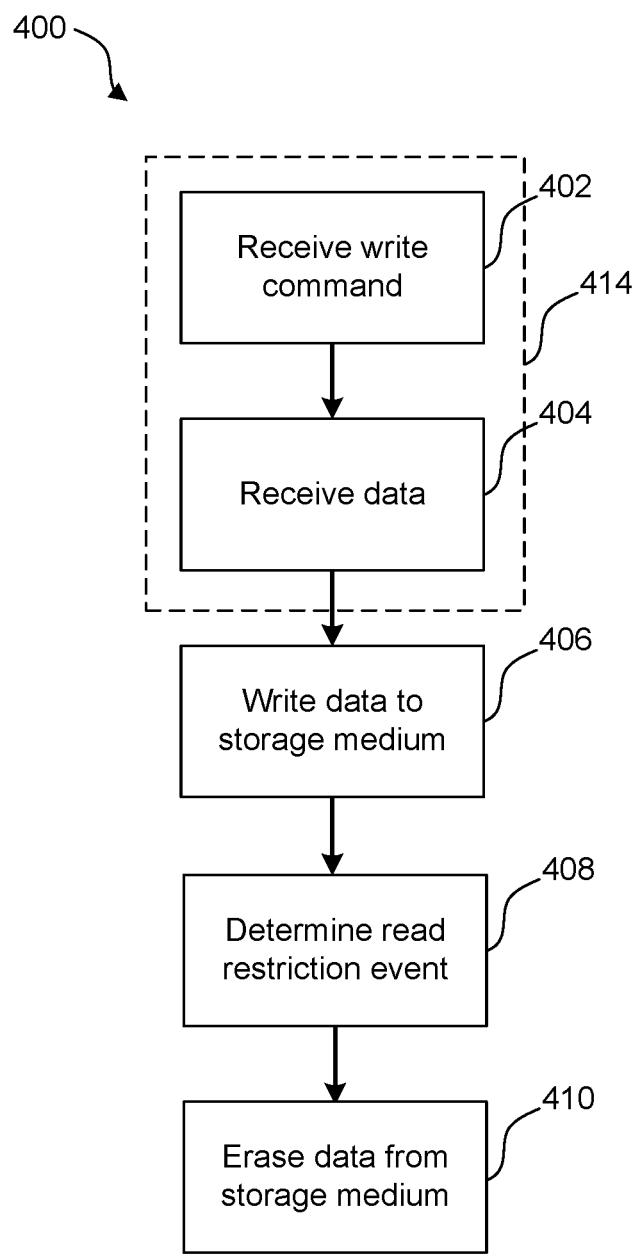
FIG. 4 is a flowchart illustrating a method for erasing data in response to a host-activated read restriction, according to an embodiment.

FIG. 4—An Improved Method of Erasing Data

FIG. 4 is a flowchart illustrating a method 400 for erasing data in response to a host-activated read restriction, according to an embodiment. Method 400 may be performed by the controller 110 of the device 100.

In step 402, the device 100 receives, via data port 180, a write command data structure from the host 130. The write command data structure comprises a read restriction indication. The read restriction indication may be located within a field of the write command data structure. The read restriction indication may comprise the read restriction event. In one embodiment, the device determines a read restriction event based on the read restriction indication. In one embodiment, the controller 110 is configured with an indication of the read restriction event. In one embodiment, the device receives, via the data port, a configuration command, wherein the configuration command comprises an indication of the read restriction event.

In step 404, the device 100 receives, via data port 180, data associated with the write command data structure received in step 402. In one embodiment, the write command data structure comprises the portion of data. Accordingly, in such an embodiment, steps 402 and 404 comprise a single step 414. In one embodiment, the write command data structure and data are received by the device as a single data structure transmitted over data interface 150. In one embodiment, the write command data structure and data are received by the device as a plurality of data structures, or packets, transmitted over data interface 150.

In step 406, the device 100 writes the portion of data received in step 404 to the storage medium 108. In one embodiment, the write command data structure comprises a write address, which indicates an address of the storage medium 108. The device writes the portion of data to the write address.

In step 408, the device 100 determines the occurrence of a read restriction event. As will be described in relation to subsequent embodiments, a read restriction event may comprise the host reading the portion of data from the storage medium, a time event, or another action performed by the host.

In step 410, in response to the occurrence of the read restriction event, and in response to the read restriction indicator, the device 100 erases the portion of data from the address of the storage medium 108.

In accordance with the improved method 400, the host 130 indicates that the portion of data to be written to the storage medium 108 of the device 100 is read restricted. According, in response to the read restriction event occurring, the device 100 erases the portion of data automatically, without the need to receive an erase command data structure from the host 130.

Advantages of Improved Method

Advantageously, method 400 provides a means for the erasure of a portion of data from the storage medium, without the need for the host to transmit an erase command to the data storage device.

Accordingly, the present disclosure provides for securing important data by erasing the data automatically by device after the data is read by the host. In an embodiment in which the read restriction event comprises the host reading the portion of data from the storage medium, the device may promptly erase the data in response to performing the read operation. Advantageously, this prompt erasure may ameliorate the risk of an unsecure read of the portion of data.

Communications over the data interface 150 to effect garbage collection and memory management may overload the data interface 150 and may block or delay the transmission of other communication between the host and the device. Advantageously, the present disclosure may reduce communication traffic over the data interface 150 because the host does not need to transmit an erase command in order to effect the data erasure.

Furthermore, the computational overhead associated with the host performing data storage management of the storage medium 108 may be advantageously reduced because the disclosed techniques provide for a means for the host to outsourced some of the data storage management to the device. For example, the host can instruct the device to retain a portion of data in the storage medium for n reads, and then automatically erase the data following the nth read.

Additionally, the apportionment of the responsibility for data storage management to the device 100 may advantageously enable the device 100 to perform data erasure at a time that is convenient for the device, rather than in response to receiving an erase command from the host. Accordingly, the device may be configured to perform data erasing operations during idle periods so that important, or time-critical operations performed by the device are not delayed due to data erasing operations.

FIG. 5—Read Method

Figure 5:
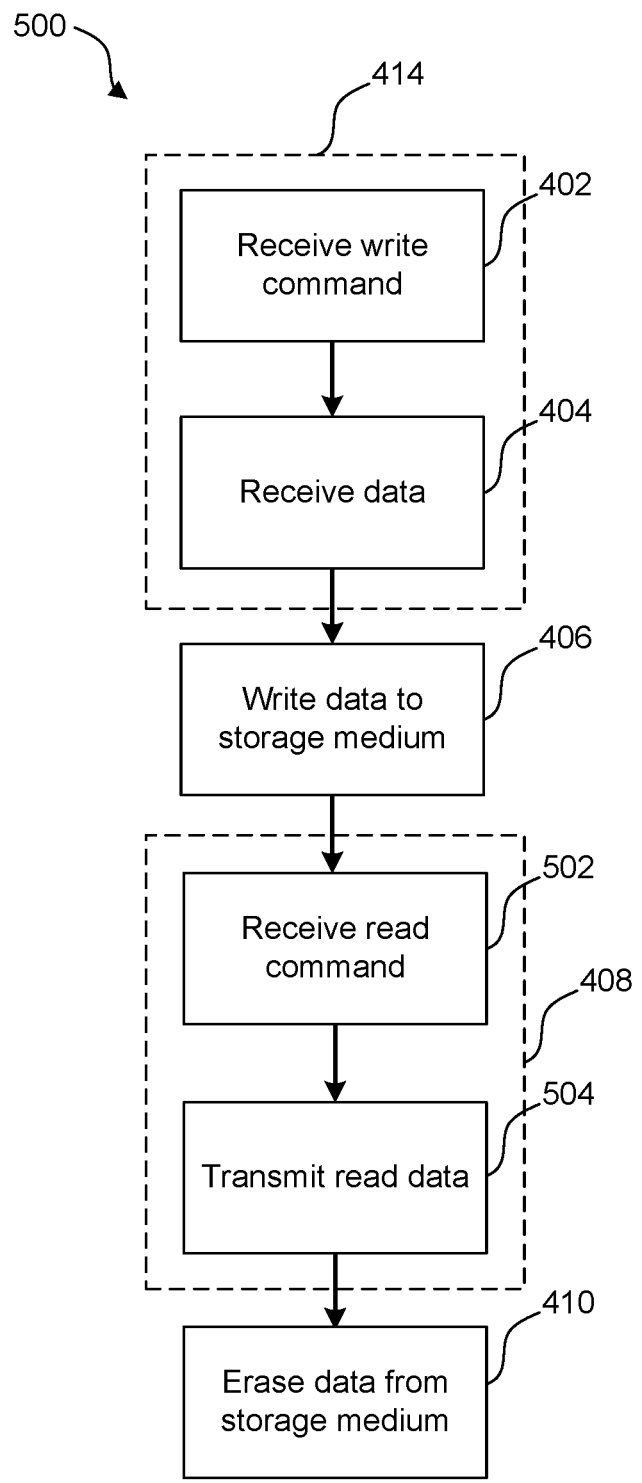
FIG. 5 is a flowchart illustrating a method for erasing data in response to a host-activated read restriction and a read event, according to an embodiment.

FIG. 5 is a flowchart illustrating a method 500 for erasing data in response to a host-activated read restriction and a read event, according to an embodiment. Method 500 is a variation of method 400 in which step 408 has been further defined as steps 502 and 504. Method 500 may be performed by the controller 110 of the device 100.

In the embodiment illustrated in FIG. 5, the read restriction indication received in step 402 further comprises an indication of a read restriction event. In this example, the read restriction event is a subsequent read of the portion of data by the host.

In step 402, the device receives a write command data structure from the host to write data to an address of the storage medium 108 of the device. The write command data structure comprises the read restriction indication. The read restriction indication comprises an indication of a read restriction event.

In step 502, the device 100 receives, via data port 180, a read command data structure. In one embodiment, the read command data structure comprises a read address which corresponds with a write address indicated by the host in the write command data structure received in step 402.

In step 504, in response to receiving the read command data structure in step 502, the device 100 reads the portion of data from the read address of the storage medium, and transmits the portion of data, via the data port 180. In one embodiment, the portion of data is transmitted by the device as a single data structure transmitted over data interface 150. In one embodiment, the portion of data is transmitted by the device as a plurality of data structures, or packets, transmitted over data interface 150.

In accordance with the method 500, the host 130 indicates that the portion of data to be written to the storage medium 108 of the device 100 is read restricted. The reading of the portion of data by the host comprises the occurrence of a read restriction event. Accordingly, in response to the portion of data being read by the host, the device 100 erases the portion of data, in step 410, without the need to receive an erase command data structure from the host 130.

Figure 6:
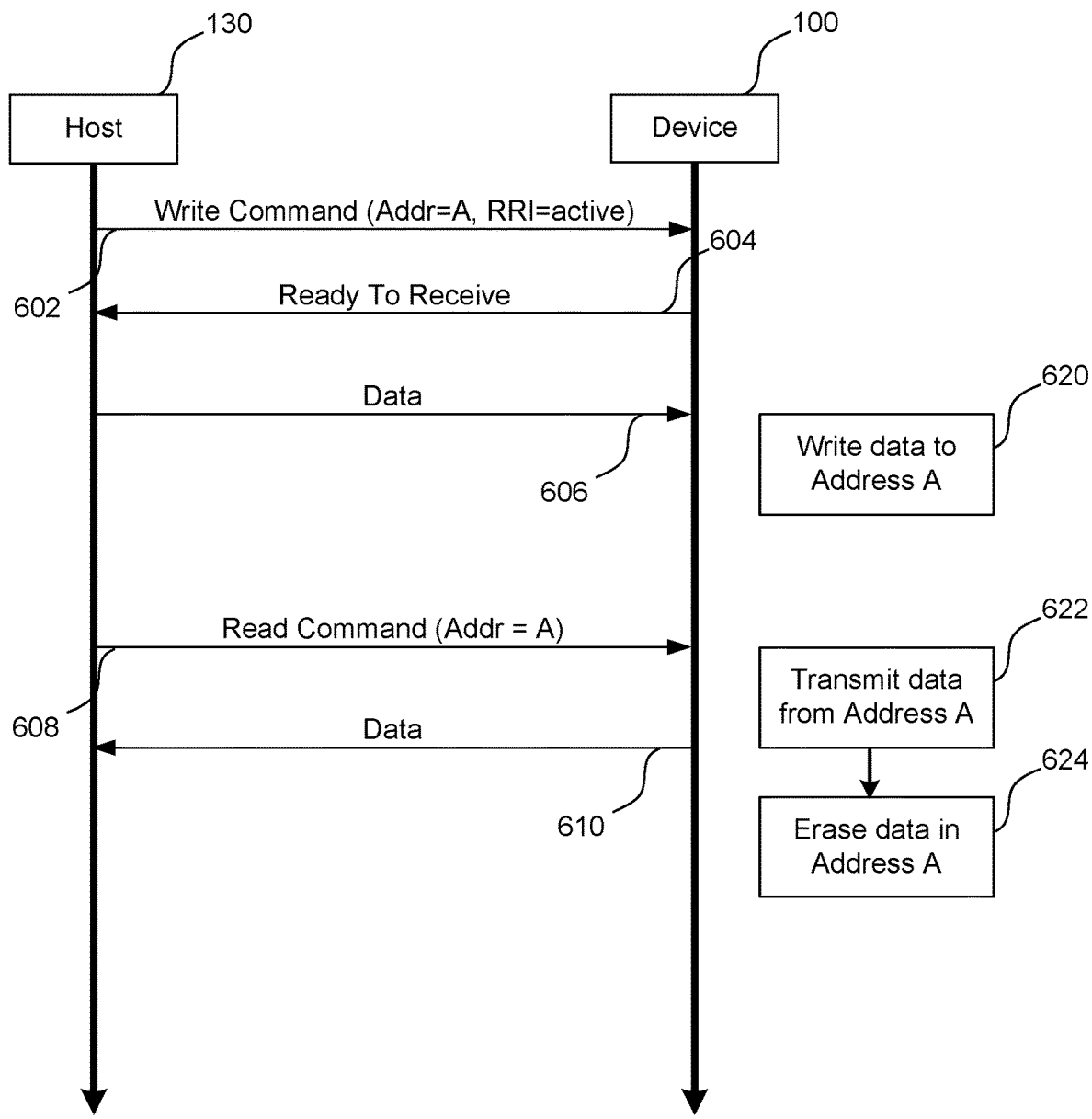
FIG. 6 is a message flow diagram illustrating a transmission of messages to effect erasure of data from storage medium, according to an embodiment.

FIG. 6—Read Example

FIG. 6 is a message flow diagram illustrating a transmission of messages, between the host 130 and the device 100, to effect the impermanent storage of data in the storage medium 108 and the subsequent erasure of data from storage medium, according to an embodiment. In the example illustrated in FIG. 6, the host provides a read restriction indication when writing the portion of data to the storage medium of the device, causing the device to erase the portion of data following a read of the portion of data by the host.

The functionality the device 100 in the example of FIG. 6 is in accordance with method 500. Accordingly, the functionality of the host 130 and the device in FIG. 6 may be contrasted with the functionality of the host and the device in the example illustrated in FIG. 3, in which the device does not function in accordance with method 500. Similarly, the messages transmitted across data interface 150 in FIG. 6 may be contrasted with the messages transmitted across data interface 150 in FIG. 3.

The command data structure 602 comprises a command for the device to write data to the storage medium 108. The write command data structure 602 further comprises an indication of a write address, Address A. The indication of a write address may comprise an address pointer, an absolute address, a file name or other indication of address. In some embodiments, the write command data structure 602 does not comprise an indication of the address, and the device determines an available address in the storage medium in which to write the write data.

The write command data structure 602 further comprises a read restriction indication, which instructs the device to erase the portion of data in response to the host reading the portion of data from the storage medium. Accordingly, the occurrence of the read restriction event comprises the host reading the portion of data from the storage medium.

In some embodiments, in response to receiving write command 602, the device transmits an acknowledgement data structure (not shown) which acknowledges receipt of write command 602 by the device. The acknowledgement data structure may comprise a JEDEC RESPONSE UIPU.

In response to receiving command data structure 602, the device determines that it is ready to receive data from the host, and the device transmits a ready-to-transfer data structure 604 to the host. Data structure 604 may comprise a JEDEC READY TO TRANSFER UPIU.

The host 130 transmits, in data structure 606, data to be written to the storage medium 108. In response to receiving the portion of data in data structure 606, the device writes 620 the portion of data to Address A of the storage medium 108.

At a subsequent time, the host 130 transmits a read command data structure (abbreviation 'read command') 608, requesting that the device 100 read portion of data from Address A of the storage medium 108 and transmit the portion of data to the host. In some embodiments, in response to receiving read command 608, the device transmits an acknowledgement data structure (not shown) which acknowledges receipt of read command 608 by the device. The acknowledgement data structure may comprise a JEDEC RESPONSE UIPU.

In response to receiving the read command data structure 608, the device reads the portion of data from the storage medium and transmits 622 the portion of data to the host in data structure 610.

In response to the read restriction indication received in write command data structure 602, and in response to the host reading the portion of data from the storage medium, the device erases 624 the portion of data at Address A of the storage medium.

Advantageously, the host did not have to transmit an erase command to the device in order to effect the erasure of the portion of data from the storage medium.

Figure 7:
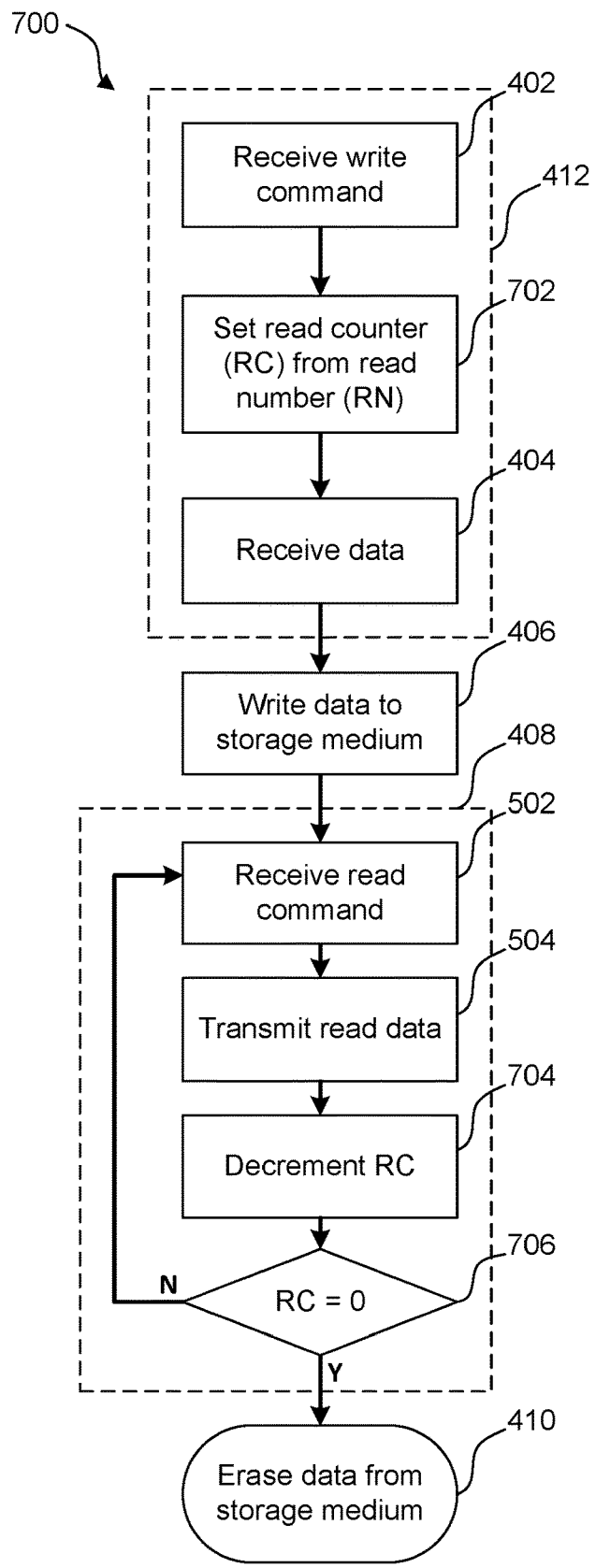
FIG. 7 is a flowchart illustrating a method for erasing data in response to a host-activated read restriction and a read number, according to an embodiment.

FIG. 7—Read Number Method

In one embodiment, the read restriction indicator comprises a read number, which instructs the device to erase the specified data after the host has read the portion of data the 'read number' of times.

FIG. 7 is a flowchart illustrating a method 700 for erasing data in response to a host-activated read restriction and a read number, according to an embodiment. Method 700 is a variation of method 500, in which steps 702, 704 and 706 have been included. Method 700 may be performed by the controller 110 of the device 100.

In the embodiment illustrated in FIG. 7, the read restriction indication received in step 402 comprises a read number. In step 702, the device 100 determines a read counter based on the read number received in step 402. In one embodiment, the device sets the read counter to be equal to the read number.

In step 504, the device transmits the portion of data to the host in response to receiving a read command data structure from the host in step 502. In step 704, the device 100 decrements the read counter.

The device determines, in decision 706, whether the read counter is equal to zero. In response to the read counter being equal to zero, the device proceeds to step 410, in which the device, in response to the read counter indicating that the portion of data has been read by the host for the 'read number' of times, and in response to the read restriction indicator, the device 100 erases the portion of data from the address of the storage medium 108.

In response to the read counter being not equal to zero, the device may proceed to step 502, in which the device may receive a further read command data structure from the host.

In another embodiment, the device may use another technique to determine that the portion of data has been read by the host for the 'read number' of times. For example, the device may maintain a read counter that is set to zero, and is incremented each time the host performs a read of the portion of data.

Figure 8:
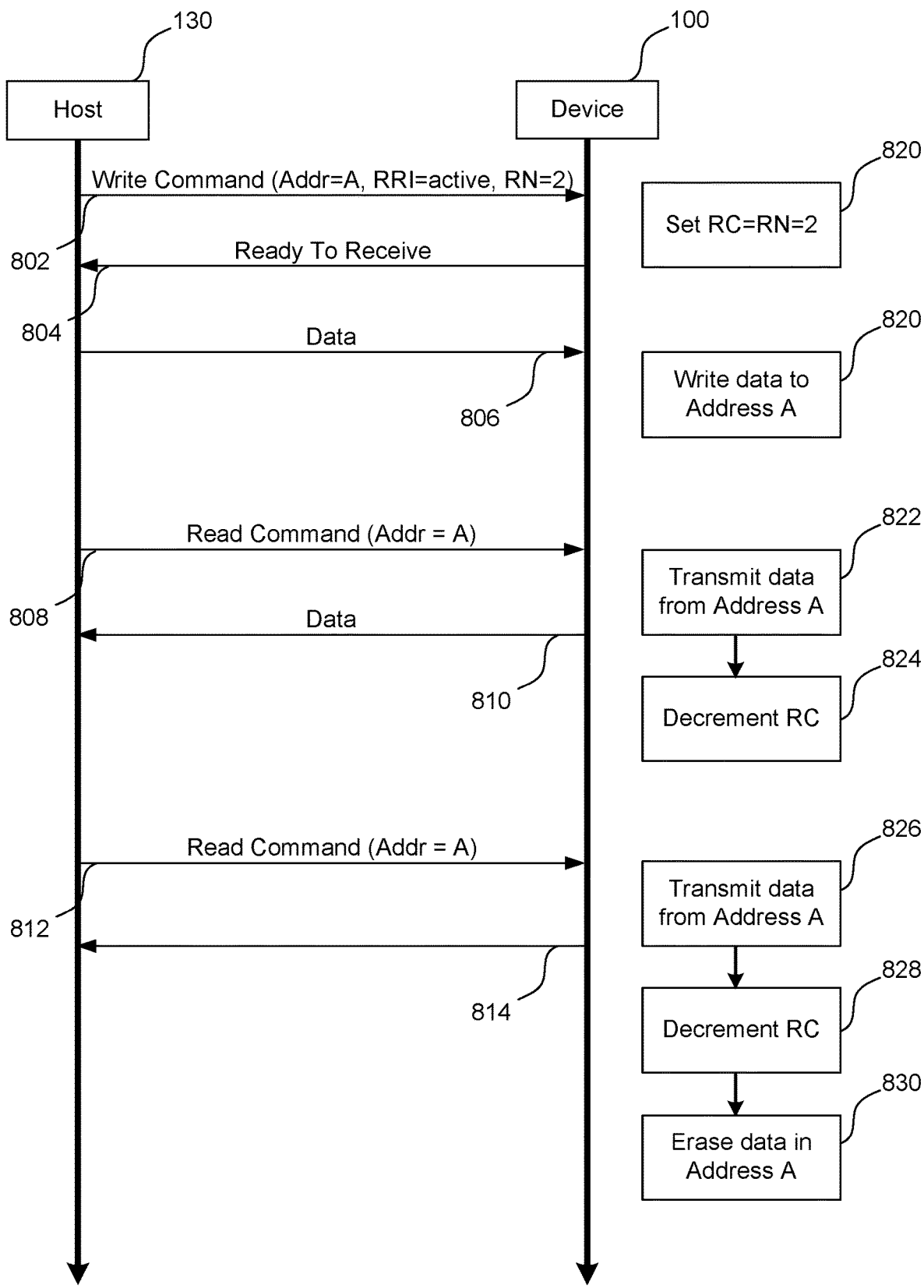
FIG. 8 is a message flow diagram illustrating a transmission of messages to effect the erasure of data from storage medium, according to another embodiment.

FIG. 8—Read Number Example

FIG. 8 is a message flow diagram illustrating a transmission of messages, between the host 130 and the device 100, to effect the impermanent storage of data in the storage medium 108 and the subsequent erasure of data from storage medium, according to an embodiment. In the example illustrated in FIG. 8, the host provides a read restriction indication and a read number when writing the portion of data to the storage medium of the device, causing the device to erase the portion of data following a number of reads of the portion of data by the host. The functionality the device 100 in the example of FIG. 8 is in accordance with method 700.

The write command data structure 802 comprises an indication of a write address, Address A, a read restriction indication and a read number. The read number is set to 2, instructing the device to erase the portion of data from the storage medium after the host has read the portion of data twice. In response to receiving the read number, the device sets a read counter to the value of the read number, being 2 in this example.

Communications 804 and 806, and write operation 820 effect the writing of the portion of data to Address A of the storage medium.

In response to receiving read command data structure 808, the device transmits the portion of data from Address A of the storage medium to the host via data structure 810. In operation 824, the device decrements the read counter from the value 2 to the value 1. The device determines that the read counter is not equal to zero. Accordingly, the device does not proceed with erasing the portion of data from the storage medium.

In response to receiving read command data structure 812, the device transmits the portion of data from Address A of the storage medium to the host via data structure 814. In operation 828, the device decrements the read counter from the value 1 to the value 0. The device determines that the read counter is equal to zero. Accordingly, the device proceeds, in operation 830, to erase the portion of data from Address A of the storage medium.

FIG. 9—Read Number Example

FIGS. 9A, 9B and 9C illustrates the contents of a section of the storage medium at three points in time, Time A, Time B and Time C, according to an embodiment.

FIG. 9A illustrates a section 900 of storage medium 108 at Time A, according to an embodiment. The section 900 comprises four sections 902, 906, 910 and 914 which store data that is not subject to a read restriction.

Section 904 stores data which the device has previously written to the storage medium in response to receiving a write command data structure comprising a read restriction indication. The read restriction indication associated with section 904 further comprised a read number indicating the number of times the portion of data in section 904 may be read before the device erases the portion of data in section 904. In response to receiving the read number in the write command data structure associated with section 904, the device set a read counter to the read number, and associated the read counter with section 904.

Similarly, 908 and 912 each store data which the device has previously written to the storage medium in response to receiving write commands comprising read restrictions and read numbers. The device has set a read counter for each of 908 and 912. For illustrative purposes the current value of the read counter associated with each section 904, 908 and 912 is illustrated within each section, respectively, in FIGS. 9A to 9C.

At time A, the read counter for section 904 is equal to 2, the read counter for section 908 is equal to 3 and the read counter for section 912 is equal to 2. Sometime after time A, in no particular order, the device receives a read command data structure 920 to read section 904, a read command data structure 922 to read sections 906 and 908, and a read command data structure 924 to read section 912, from the host. In response to the host reading from these sections, and in response to some of these sections being read restricted, the device decrements each of the read counters associated with sections 904, 908 and 912. Notably, section 906 is not read restricted. Accordingly, there is no read counter associated with 906.

FIG. 9B illustrates section 900 of storage medium 108 at Time B, according to an embodiment. At time B, the read counter for section 904 is equal to 1, the read counter for section 908 is equal to 2 and the read counter for section 912 is equal to 1.

The device receives a read command data structure 926 to read sections 902, 904, 906, 908, 910 and a portion of section 912. In response to the host reading from these sections, and in response to some of these sections being read restricted, the device decrements each of the read counters associated with sections 904, 908 and 912.

The read counters associated with section 904 and section 912 are decremented from a value of 1 to a value of 0. Accordingly, in response to the read counters associated with sections 904 and section 912 being equal to 0, the device erases the portion of data stored in sections 904 and 912 of the storage medium.

Notably, even though only a portion of section 912 was read by the host, in accordance with read command data structure 926, the device is configured to decrement the read count in response to any portion of a read restricted section being read. In another embodiment, or for another section of the storage medium, the device may be configured to maintain a plurality of read counters for each portion of a plurality of portions of the storage medium, and the device may be configured to decrement only the read counters that are associated with portions of the storage medium that are read, in response to receiving a read command via the data port.

Alternatively, the device may be configured not to decrement the read counter in response to only a portion of the section of the storage medium being read by the host.

FIG. 9C illustrates section 900 of storage medium 108 at Time C, according to an embodiment. FIG. 9C illustrates that following the read operation instructed by read command data structure 926, the read counter associated with section 908 has been decremented to a value of 1, and the portion of data in sections 904 and 912 has been erased (as indicated by hashing).

Figure 10:
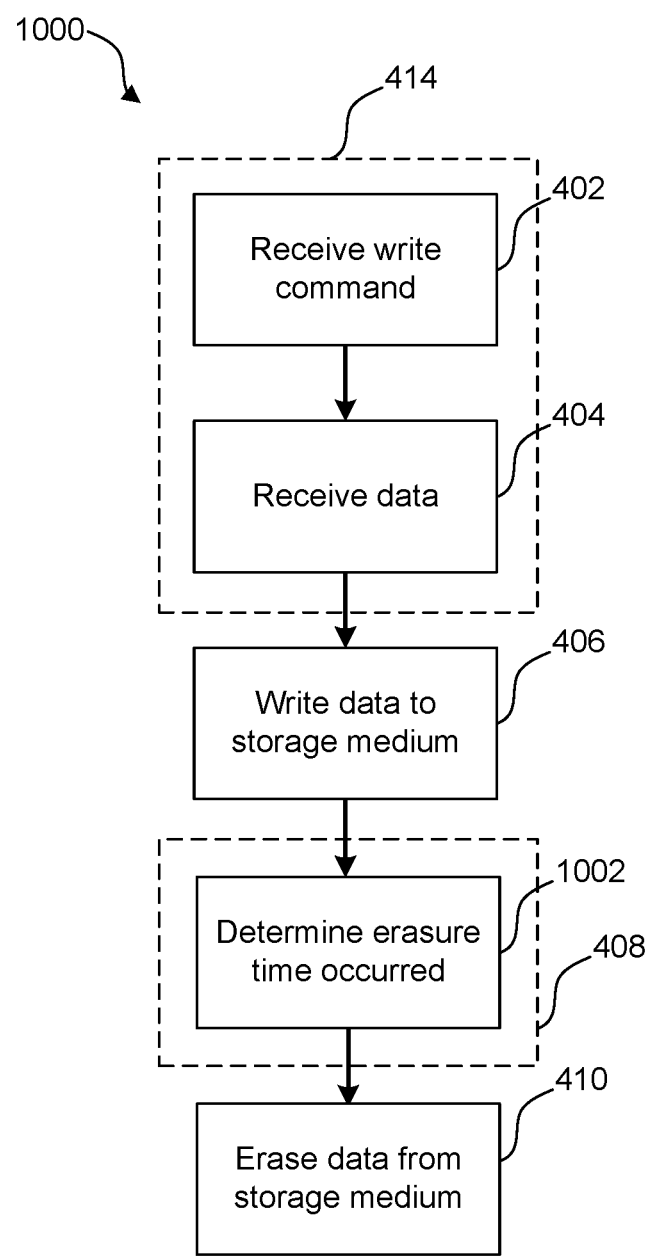
FIG. 10 is a flowchart illustrating a method for erasing data in response to a host-activated read restriction and a time-based event, according to an embodiment.

FIG. 10—Time Based Method

In one embodiment, the read restriction event comprises a time-based occurrence. The device may be configured to maintain a measure of time that is synchronous with a measure of time maintained by the host, or another component. In another embodiment, the device may be configured to maintain a measure of relative time, which may be calculated based on a number of cycles of reference clock 190.

FIG. 10 is a flowchart illustrating a method 1000 for erasing data in response to a host-activated read restriction and a time-based event, according to an embodiment. Method 1000 is a variation of method 400 in which step 408 has been further defined as step 1002. Method 1000 may be performed by the controller 110 of the device 100.

In the embodiment illustrated in FIG. 10, the read restriction indication received in step 402 comprises an indication of a restriction time. In this example, the read restriction event is a restriction time. The restriction time may indicate an absolute time, such as 7:00 am, or indicate of an absolute time and data, such as 7:00 am on 2 May 2023. In another embodiment, the restriction time may indicate a relative time, such as 2 hours, or 10 days. The relative time may be determined from the time at which the device receives the write command data structure, the time that the host transmits the write command data structure, or the time at which the device writes the portion of data to the storage medium.

In step 402, the device receives a write command data structure from the host to write data to an address of the storage medium 108 of the device. The write command data structure comprises the read restriction indication. The read restriction indication comprises an indication of a read restriction event, being the restriction time in this example.

In one embodiment, in step 402, the device determines a time (hereafter 'an erasure time') at which the device should erase the portion of data from the storage medium, based on the restriction time. The occurrence of the erasure time is considered to be a read restriction event.

In step 1002, the device determines the occurrence of the erasure time. In response to the read restriction indication received in step 402, and in response to the occurrence of the erasure time, being a read restriction event, the device 100 erases the portion of data from the address of the storage medium 108, in step 410.

In one embodiment, the indication of a restriction time is not received by the device, via the portion of data point.

Figure 11:
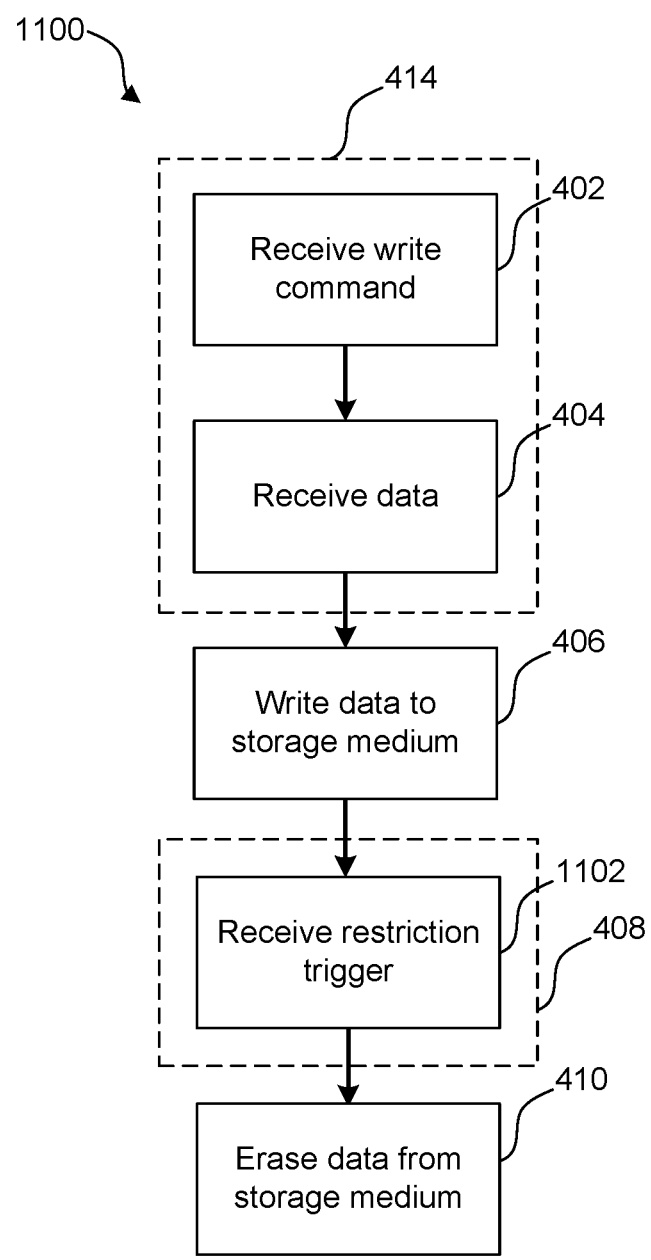
FIG. 11 is a flowchart illustrating a method for erasing data in response to a host-activated read restriction and a trigger event, according to an embodiment.

FIG. 11—Trigger-Based Method

In one embodiment, the read restriction event comprises the occurrence of a trigger event. The trigger event may comprise the receipt, by the device, of a specified command from the host. The trigger event may comprise the receipt, by the device, of a signal from a component associated with the device, e.g. via the I/O interface 103 or the sensors 111.

FIG. 11 is a flowchart illustrating a method 1100 for erasing data in response to a host-activated read restriction and a trigger event, according to an embodiment. Method 1100 is a variation of method 400 in which step 408 has been further defined by step 1102. Method 1100 may be performed by the controller 110 of the device 100.

In step 402, the device receives a write command data structure from the host to write data to an address of the storage medium 108 of the device. The write command data structure comprises a read restriction indication. The read restriction indication comprises an indication of a read restriction event. In this example, the read restriction event comprises a trigger event. In one embodiment, the trigger event comprises the host transmitting, to the device, an initialisation command. In another embodiment, the trigger event comprises the device receiving a subsequent write command data structure. In another embodiment, the trigger event comprises the device receiving a signal from a button communicatively coupled to the I/O interface 103. In another embodiment, the trigger event comprises a determination of motion, as sensed by an accelerometer communicatively coupled to the device via sensors 111.

In step 1102, the device determines the occurrence of the read restriction event, being the trigger event. Accordingly, in response to the read restriction indication received in step 402, and in response to the occurrence of the trigger event, the device 100 erases the portion of data from the address of the storage medium 108, in step 410.

Error Messages

In one embodiment, the device is configured to transmit an error message, via the data port, in response to receiving a read command data structure to read data from an address in which read restriction data has been erased.

Data Erasure Types

A device may be configured to perform one or more different types of data erasure. The read restriction indication may comprise an indication of an erase type. The device may be configured to erase the portion of data in accordance with the erase type.

In one embodiment, the device is configured to erase the portion of data via a logical data erase (otherwise called a logical deletion). A logical data erase may comprise setting an indication, e.g. a flag, associated with the portion of data, to indicate that the portion of data has been logically erased.

In one embodiment, the device is configured to erase the portion of data by logically demapping (otherwise called unmapping) or deallocating the portion of data. This may comprise deleting, releasing or removing one or more pointers to the portion of data. In one embodiment, the device is configured to erase the portion of data by marking the portion of data as unreadable. In one embodiment, the device is configured to erase the portion of data by deleting or overwriting logical-block-addressing data associated with the portion of data.

In one embodiment, the device is configured to erase the portion of data by overwriting the portion of data with other data, otherwise called 'overwrite data'. In one example, the device is configured to erase the portion of data by overwriting each bit of the portion of data with the binary value '1'. In one example, the device is configured to erase the portion of data by overwriting each bit of the portion of data with the binary value '0'. In one example, the device is configured to erase the portion of data by overwriting the portion of data with pseudo-randomly generated data.

In one embodiment, the device is configured to erase the portion of data by encrypting the portion of data. In one embodiment, the device is configured to erase the portion of data by physically erasing the portion of data.

Erase Priority

In one embodiment, the read restriction indication comprises an indication of erase priority. The erase priority may indicate to the device a priority associated with erasing the portion of data. In one embodiment, the erase priority may indicate that the device must erase the portion of data immediately in response to the occurrence of a read restriction event. Alternatively, the erase priority may indicate that the device need not erase the portion of data immediately in response to the occurrence of a read restriction event. Accordingly, the device may perform the erase operation at a time that is convenient for the device, e.g. when the device is idle. Advantageously, an indication of erase priority may enable the controller 110 to prioritise the operations of the device and therefore improve the performance of the device.

Configured Read Restriction Event

In one embodiment, the data storage device receives, via the data port, a configuration command comprising an indication of the read restriction event. In one embodiment, the device 100 is configured to apply read restriction to all portions of data that are written to the storage medium 108, in accordance with the read restriction event.

Figure 12:
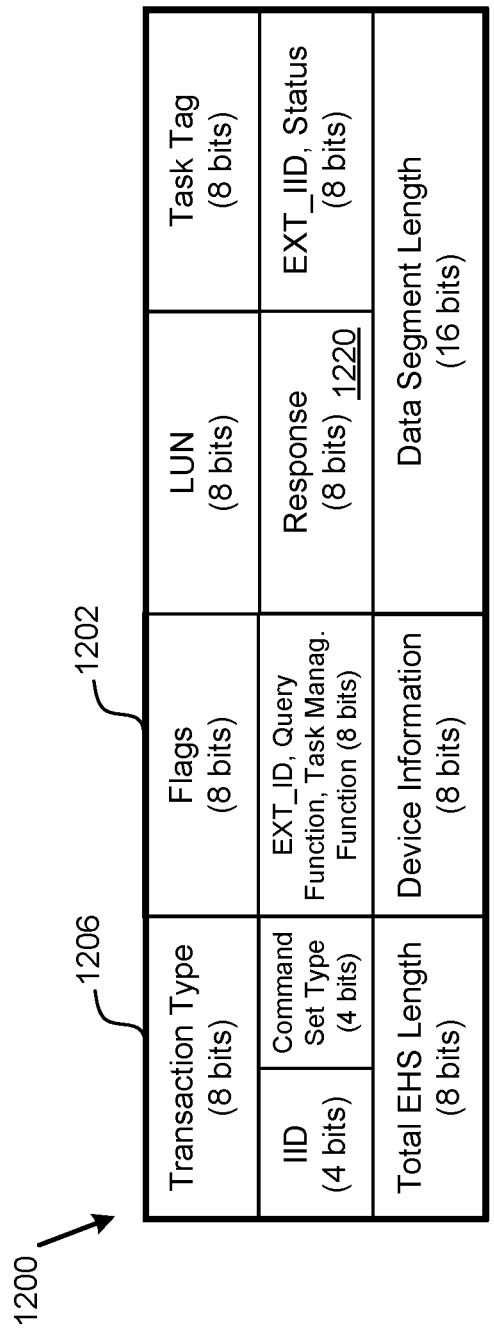
FIG. 12 illustrates the fields of a UPIU header segment in accordance with the JEDEC Integrated UFS 4.0 communication standard, according to an embodiment.
Figure 13:
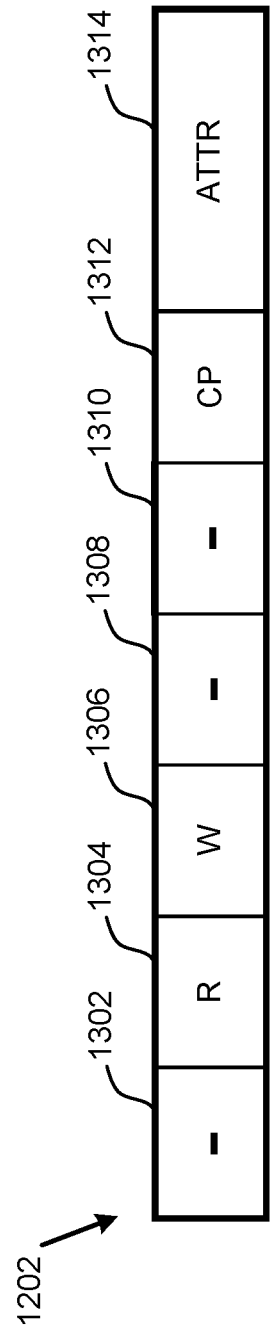
FIG. 13 illustrates the flag field of the UPIU header illustrated in FIG. 12 for a Command UIPU data structure, according to an embodiment.

FIGS. 12 and 13—UPIU Header

FIG. 12 illustrates the fields of a UPIU header segment 1200 in accordance with the JEDEC Integrated UFS 4.0 communication standard, according to an embodiment. The JEDEC Integrated UFS 4.0 communication standard defines a plurality of different UPIU transaction types. Transaction type field 1206 may be used by the transmitter of a UPIU data structure to indicate the type of UPIU transaction to which the data structure belongs.

The UPIU header segment further comprises a flag field 1202. FIG. 13 illustrates the flag field 1202 of the UPIU header 1200 illustrated in FIG. 12 for a Command UIPU data structure, according to an embodiment. The flag field 1202 for a Command UIPU data structure comprises a read flag 1304, which indicates a read data operation from the device to the host, and a write flag 1306, which indicates a write data operation from the host to the device. The flag field 1202 further comprises a command priority flag 1312 and an attribute flag 1314. The flag field 1202 further comprises three reserved bits 1302, 1308 and 1310, which are not used for the Command UIPU.

Location of Read Restriction Information

In one embodiment, the write command data structure comprises a JEDEC USF 4.0 Command UIPU data structure. Alternatively, the write command data structure may comprise a JEDEC USF 4.0 Data Out UPIU data structure. Alternatively, the write command data structure may comprise any command issued by the host 130 to the device 100 to effect the writing of data to the storage medium 108.

In one embodiment, the read restriction information is located within one or more reserved fields of the UIPU header of the write command data structure. For example, the host 130 may locate the read restriction information in one or more of the three reserved bits 1302, 1308 or 1310 of the flag field 1220 of a UPIU header for a command data structure of type=Command.

In one embodiment, the read restriction information is located with the body of the write command data structure. In one embodiment, the read restriction information is located within one or more reserved fields of the UIPU body of the write command data structure.

In one embodiment, the read restriction information comprises a single bit flag, which when set to '1' indicates that read restriction is activated, and when set to '0' indicates that read restriction is deactivated.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:
1. A method comprising:
receiving, via a data port of a data storage device, a write command data structure comprising a read restriction indication, wherein:
the data storage device comprises a non-volatile storage medium configured to store data;
the data port is configured to receive and transmit data between a host computer system and the data storage device;
the write command data structure comprises a header and a body; and
the read restriction indication comprises;
at least one reserved field in the header or the body; and
an indication to select at least one trigger event from a plurality of trigger events;
receiving, via the data port, a portion of data;
writing the portion of data to an address of the non-volatile storage medium;

determining an occurrence of the selected at least one trigger event; and erasing, in response to the occurrence of selected at least one trigger event and in response to the read restriction indication, the portion of data from the address of the non-volatile storage medium.

2. The method of claim 1, wherein the indication to select the at least one trigger event is in a reserved field of the body of the write command data structure.

3. The method of claim 1, wherein the selected at least one trigger event is selected from a set of trigger event types including at least two of:
a read restriction event based on a read number of read commands;
a time event indicating a restriction time;
receiving an initialization command from the host computer system;
receiving a subsequent write command data structure;
receiving a signal from a button communicatively coupled to the data storage device; and
determination of motion from an accelerometer communicatively coupled to the data storage device.

4. A data storage device comprising:
a non-volatile storage medium configured to store user data;
a data port configured to receive and transmit data between a host computer system and the data storage device; and
at least one processor configured to, alone or in combination:
receive, via the data port, a write command data structure comprising a read restriction indication, wherein:
the write command data structure comprises a header and a body; and
the read restriction indication comprises:
at least one reserved field in the header or the body; and
an indication to select at least one trigger event from a plurality of trigger events;
receive, via the data port, a portion of data;
write the portion of data to an address of the non-volatile storage medium;
determine an occurrence of the selected at least one trigger event; and
erase, in response to the occurrence of the selected at least one trigger event and in response to the read restriction indication, the portion of data from the address of the non-volatile storage medium.

5. The data storage device of claim 4, wherein:
the indication to select the at least one trigger event indicates a read restriction event based on a read number of read commands to read the portion of data from the address of the non-volatile storage medium; and
determining the occurrence of the read restriction event comprises receiving, via the data port, a read command to read the portion of data from the address of the non-volatile storage medium.

6. The data storage device of claim 4, wherein the at least one processor is further configured to, alone or in combination:
receive, via the data port, a read command to read the portion of data from the address of the non-volatile storage medium; and transmit, in response to receiving the read command and via the data port, the portion of data from the address of the non-volatile storage medium.

7. The data storage device of claim 5, wherein:
the read restriction indication further comprises a parameter value indicating the read number of read commands; and
determining the occurrence of the at least one trigger event comprises receiving, via the data port, the read number of read commands to read the portion of data from the address of the non-volatile storage medium.

8. The data storage device of claim 7, wherein the read restriction indication further comprises the parameter value indicating the read number in a reserved field of the body of the write command data structure.

9. The data storage device of claim 4, wherein:
the selected at least one trigger event comprises a time event;
the read restriction indication comprises an indication of a restriction time for the time event in a reserved field of the body of the write command data structure; and
determining an occurrence of the selected at least one trigger event comprises determining an occurrence of a time event.

10. The data storage device of claim 4, wherein the selected at least one trigger event is selected from a set of trigger event types including at least two of:
receiving an initialization command from the host computer system;
receiving a subsequent write command data structure;
receiving a signal from a button communicatively coupled to the at least one processor; and
determination of motion from an accelerometer communicatively coupled to the at least one processor.

11. The data storage device of claim 10, wherein the indication of the at least one trigger event is in a reserved field of the body of the write command data structure.

12. The data storage device of claim 10, wherein the set of trigger event types further includes a read restriction event based on a read number of read commands.

13. The data storage device of claim 10, wherein the set of trigger event types further includes a time event indicating a restriction time.

14. The data storage device of claim 4, wherein the write command data structure further comprises an indication of the address of the non-volatile storage medium.

15. The data storage device of claim 4, wherein:
the read restriction indication comprises an indication of erase priority; and
the at least one processor is further configured to, alone or in combination, erase the data from the address of the non-volatile storage medium in accordance with the erase priority.

16. The data storage device of claim 4, wherein erasing the portion of data from the address comprises demapping a logical block address associated with the portion of data.

17. The data storage device of claim 4, wherein erasing the portion of data from the address comprises writing overwrite data to the address.

18. The data storage device of claim 4, wherein the write command data structure is compatible with a version of a Joint Electron Device Engineering Council (JEDEC) Integrated Universal Flash Storage (UFS) Specification.

19. The data storage device of claim 4, wherein the write command data structure comprises a Universal Flash Storage (UFS) Protocol Information Unit data structure.

20. A data storage device comprising:
a non-volatile storage medium configured to store data;
means to receive and transmit data between a host computer system and the data storage device; and
means to:
  receive a write command data structure comprising a read restriction indication, wherein:
    the write command data structure comprises a header and a body; and
    the read restriction indication comprises:
      at least one reserved field in the header or the body; and
      an indication to select at least one trigger event from a plurality of trigger events;
  receive a portion of data;
  write the portion of data to the non-volatile storage medium;
  determine an occurrence of the selected at least one trigger event; and
  erase, in response to the selected at least one trigger event and in response to the read restriction indication, the portion of data from the non-volatile storage medium.

* * * * *